Patented Dec. 18, 1923.

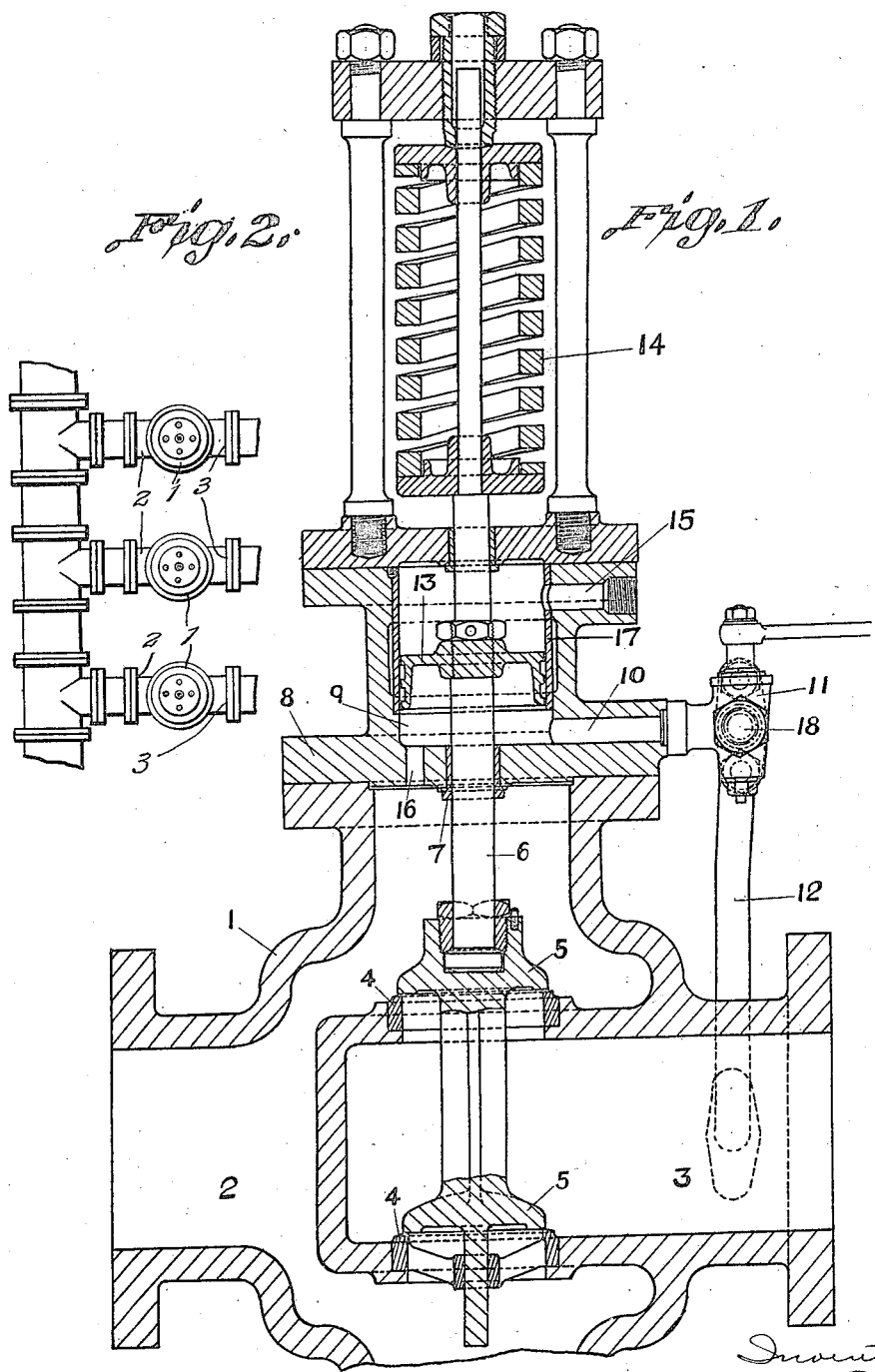

1,478,320

UNITED STATES PATENT OFFICE.

ALLAN BAXTER, OF MOTHERWELL, SCOTLAND.

VALVE FOR FEED-WATER SUPPLY TO STEAM GENERATORS AND THE LIKE.

Application filed April 7, 1923. Serial No. 630,645.

*To all whom it may concern:*

Be it known that I, ALLAN BAXTER, British subject, and a resident of Motherwell, Lanarkshire, Scotland, have invented certain new and useful Improvements in Valves for Feed-Water Supply to Steam Generators and the like, of which the following is a specification.

In the supply of feed water to the feed-water heaters or economizers of steam generators and the like and in other fluid-pressure systems, it has been proposed to provide an automatic stop valve which automatically closes in the event of a defect or leakage occurring in one or more of a series of economizers or in the fluid-pressure system.

The present invention refers more particularly to automatic stop valve mechanisms of the type in which a stop valve for controlling the fluid supply carries a co-axial piston working in a cylinder interposed in a cross-connection between the inlet and discharge sides of the valve, and the object of the present invention is to provide an improved and simplified mechanism of this type which will automatically re-open the valve upon obturating or remedying the defect.

In automatic stop valve mechanisms of the type above referred to, the cylinder spaces on both sides of the piston have heretofore been connected either by a by-pass or by a passage through the piston, and a connection has been provided from the inlet side of the valve to the cylinder space above the piston, the cylinder space beneath the piston being connected to the discharge side of the valve.

According to the present invention the automatic stop valve mechanism, which is of the type above referred to, has a spring for closing the stop valve, a connection to atmosphere only from the cylinder space above the piston, a direct connection from the inlet side of the valve to the cylinder space beneath the piston, and a connection to the discharge side of the valve from the cylinder space beneath the piston. The cylinder spaces on the two sides of the piston are not in communication with each other. A defect in the fluid pressure system causes the spring to close the valve and the restoration of the fluid pressure (by obturating or remedying the defect) causes the fluid pressure to automatically lift or reopen the stop-valve against the action of its closing spring.

An automatic stop-valve mechanism constructed according to my invention may be inserted in each of a plurality of supply pipes fed from a common main and arranged in parallel on the inlet sides of a plurality of economizers or other elements, so that the several valves will simultaneously and automatically close and temporarily cut off the feed-water supply to the economizers in the event of a defect or leakage in one or more of the economizers, whereby the valves of the defective economizer or economizers will obturate the defects and remain closed, thus restoring the fluid pressure in the system and causing the valves of the non-defective economizers to automatically reopen and thus restore the feed-water supply to the non-defective economizers whilst the defective economizers remain cut off.

By this arrangement, entire loss of water due to a breakdown in the economizer tubes is avoided and defects may be more readily detected.

Although the present improvement is primarily intended for use in conjunction with economizers, it is to be understood that it is equally applicable to other fluid pressure systems in which a liquid or gas is supplied under pressure to a plurality of elements in which defects are liable to occur.

A non-return valve may be inserted in the delivery pipe or connection on the outlet side of each economizer for preventing the water supply to the steam generator through the non-defective economizers from returning through the defective economizer.

The valve stem is loaded by means of the spring, in such a manner that the normal water pressure overcomes the load on the valve stem and opens the valve, whilst any appreciable drop in pressure due to a defect in the economizers allows the load on the valve stem to close the valve.

In the event of a defect, the cross connection remains open to the defective economizer, so that the inlet valve will remain closed.

A try cock is provided to control the cross-connection and also adapted to open the cross-connection to a drain pipe or passage. This cock will enable the valve to be tested periodically and will enable the water supply to the economizer to be completely cut off whilst repairs are being effected. The cross-connection may be either in the form of pipes connecting the water pipes on both sides of the valve to the cylinder space beneath the piston or in the form of a passage or passages in the valve casing.

An audible or visible signal may be connected to the inlet valve stem in order to indicate when and in which economizer a defect has occurred.

In order that the invention may be more clearly understood reference is hereinafter made to the accompanying explanatory drawing showing by way of example one construction of automatic stop valve mechanism according to the present invention.

Fig. 1 is a vertical sectional view through the valve and valve casing constructed in accordance with this invention, and Fig. 2 is a fragmentary diagrammatic view showing a plurality of valves connected in parallel with a main supply pipe.

The valve casing 1 is provided with an inlet 2 for the feed-water or other pressure fluid and an outlet 3 to the economizer or other element to which the pressure fluid is to be supplied. In the construction shown the valve casing is provided with valve seats 4 controlled by a double beat valve 5, which is carried at one end of a spindle 6 which passes through a bush 7 in a cover 8 on the valve casing. A small port 16 in the cover 8 opens into a cylinder 9 above the cover 8, said cylinder communicating by way of a passage 10 with a try cock 11 which has a connection 12 to the outlet 3. A piston 13 works in the cylinder 9 and is carried by the valve spindle 6. The valve spindle 6 may be loaded in known manner by means of a spring 14 or its equivalent. The cylinder 9 is preferably provided with a liner 17 and connects with a vent pipe 15 so that air may have free access to the upper side of the piston 13 whilst any water or other pressure fluid which may creep past the piston 13 to the upper side thereof, may be discharged through the vent pipe 15.

It will be understood that each economizer or other element to be supplied with pressure fluid is fitted with a valve similar to that shown on the accompanying drawing and that the valve is loaded by means of the spring 14 in such a manner that the normal pressure of the pressure fluid acting on the piston 13 will overcome the resistance of the spring 14 and lift the valve 5 off the valve seats 4, whilst any appreciable drop in the pressure of the pressure fluid will allow the spring 14 to close the valve.

It will be seen that during normal working conditions, the pressure fluid will enter the valve casing by way of the inlet 2 and will pass through the port 16 into the cylinder 9, thereby lifting the piston 13 against the pressure of the valve spring 14. The valve 5 will thus be lifted off its seat 4 and allow the direct supply of the pressure fluid to the outlet 3. At the same time a small quantity of the pressure fluid will pass through the cylinder 9 by way of the passage 10, try cock 11 and connection 12 to the outlet side of the valve.

In the event of a defect arising in one or other of the economizers, the reduction of pressure in the system will cause a corresponding reduction of pressure in the cylinders 9 and thus cause the spring 14 of each valve to close the valves on to their valve seats 4 and thus temporarily cut off the fluid supply to the economizers. Thereupon the pressure of the fluid at the inlet side of the valves will be automatically restored and will thus be restored within the cylinders 9 of the non-defective economizer valves, consequently lifting the valves 5 of the non-defective economizers. In the case of the defective economizer valve, however, the defect therein will cause a constant leakage of the fluid through the port 16, cylinder 9, passage 10, try cock 11 and connection 12 and will thus prevent the pressure in the cylinder 9 from being restored. Consequently the valve of the defective economizer will remain closed.

The try cock 11 also controls a drain or escape pipe 18 so that the passage 10 may be either connected to the connection 12 or to the escape pipe 18. The cock 11 is also adapted to completely cut off the passage 10 so that the complete valve unit may be tested periodically and so that the pressure fluid supply to the connection 12 may be completely cut off whilst repairs are being effected.

Claims:

1. An automatic stop valve mechanism of the character described comprising a stop valve for controlling the fluid supply, a cylinder co-axial with the valve, a piston in said cylinder and connected to said valve, a loading device for closing said valve, a connection to atmosphere only from the cylinder space above the piston, a direct connection from the inlet side of the valve to the cylinder space beneath the piston and a connection to the discharge side of the valve from the cylinder space beneath the piston.

2. An automatic stop valve mechanism of the character described comprising a valve casing having an inlet and outlet, a stop valve controlling said outlet, a loaded valve stem connected to said valve, a cylinder co-axial with the valve, a piston in said cylinder and mounted on said stem, a connection to atmosphere only from the cylinder space above the piston, a direct connection from the valve casing inlet to the cylinder space beneath the piston and a connection to the valve casing outlet from the cylinder space beneath the piston.

3. An automatic stop valve mechanism of the character described comprising a valve casing having an inlet and outlet, a stop valve controlling said outlet, a loaded valve stem connected to said valve and extending through said casing, a cylinder mounted on said casing, a piston in said cylinder and mounted on said stem, a connection to atmosphere only from the cylinder space above the piston, a fluid passage through said valve casing from the inlet side of the valve to the cylinder space beneath the piston, and a valve-controlled connection from the cylinder space beneath the piston to the valve casing outlet.

4. A stop valve mechanism as specified in claim 1 having a try-cock in the connection to the discharge side of the valve for closing said connection.

5. A stop valve mechanism as specified in claim 1 having an escape branch from the connection to the discharge side of the valve and a three-way try-cock at the junction thereof.

6. In a fluid pressure system, the combination with a plurality of supply pipes fed from a common main and arranged in parallel on the inlet sides of a plurality of elements, of a plurality of automatic stop valve mechanisms, each as specified in claim 1 and each inserted in one of said supply pipes whereby, in the event of a defect in one or more of said elements, the several valve mechanisms will simultaneously and automatically close the valves, thus obturating the defects and automatically restoring the fluid pressure in the system, whereupon the valve of the defective element will remain closed until the defect is remedied, whilst the valves of the non-defective elements will reopen automatically.

The foregoing specification signed at Glasgow, Scotland, this nineteenth day of March, 1923.

ALLAN BAXTER.